J. J. LAWLER.
THERMOSTATIC VALVE FOR WATER.
APPLICATION FILED APR. 18, 1911.
1,024,729.
Patented Apr. 30, 1912.
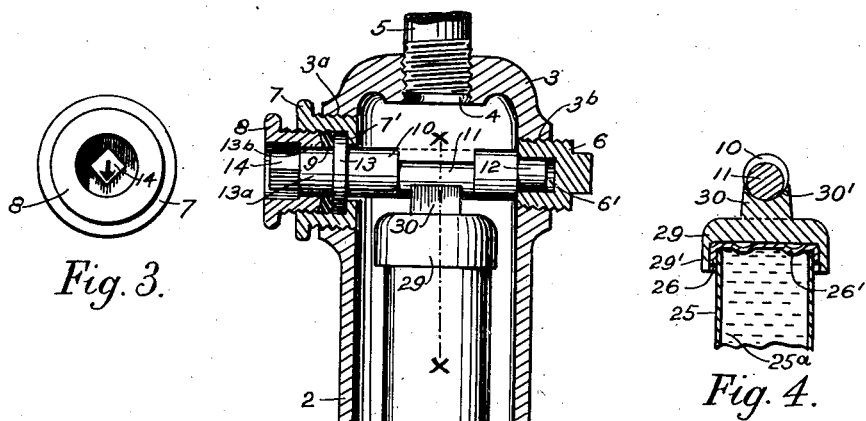
Fig. 3.
Fig. 4.
Fig. 5.
Fig. 1.
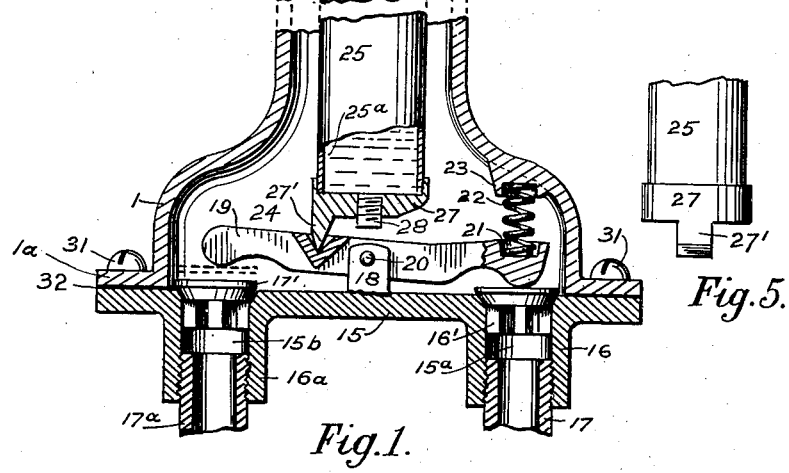
Fig. 2.
WITNESSES:
Edgar M. Greenbaum
Charles V. Swyer
INVENTOR
James J. Lawler
BY
E. H. Gennert
ATTORNEY

UNITED STATES PATENT OFFICE.

JAMES J. LAWLER, OF PELHAM, NEW YORK.

THERMOSTATIC VALVE FOR WATER.

1,024,729.  Specification of Letters Patent.  Patented Apr. 30, 1912.

Application filed April 18, 1911. Serial No. 621,887.

*To all whom it may concern:*

Be it known that I, JAMES J. LAWLER, a citizen of the United States, and resident of Pelham, in the county of Westchester and State of New York, have invented certain new and useful Improvements in Thermostatic Valves for Water, of which the following is a specification.

This invention relates to thermostatic valves for controlling the temperature of water from hot and cold water supplies and has for its object to provide a valve in a manner as hereinafter set forth for automatically causing a supply of water at a uniform temperature regardless of the temperature of either of the two said supplies.

A further object of the invention is to provide a thermostatic valve with means in a manner as hereinafter set forth for quickly changing when required the temperature of the water at the outlet.

Further objects of the invention are to provide in a manner as hereinafter set forth a thermostatic valve for controlling the temperature of hot and cold water supplies and which is comparatively simple in its construction and arrangement, strong, durable, efficient in its use, readily set up in operative position with respect to the said supplies, and comparatively inexpensive to manufacture.

With the foregoing and other objects in view, the invention consists of the novel construction, combination and arrangement of parts as hereinafter more specifically described and illustrated in the drawings wherein is shown the preferred embodiment of the invention, but it is to be understood that changes, variations and modifications can be resorted to which come within the scope of the claims hereunto appended.

In the drawings wherein like reference characters denote corresponding parts throughout the several views: Figure 1 is a sectional elevation of an automatic controlling valve in accordance with this invention, the expansion tube, an element of said valve having the lower end broken away. Fig. 2 is a plan view of the supporting plate for the valve casing, the casing being shown in dotted lines and the expansion tube, an element of the valve in a dot and dash circle. Fig. 3 is a front elevation of the manually operable regulator and the stuffing box therefor. Fig. 4 is a sectional view on line X—X of Fig. 1, and, Fig. 5 is a side elevation of the lower end of the expansion tube looking from the regulator side.

Preferably the shape of the device is as shown so as to produce a narrow annular passage for the mixed water and furthermore to occupy but little space where used. The size of the device will vary according to the quantity of water to be mixed; it is obvious that for dye works, laundries and similar places, the valve will be larger than a valve used in an individual bath-room, though the construction and operation will be identical.

The valve casing or housing is preferably constructed of a metallic casting and includes a flaring base 1, a cylindrical intermediate portion 2, and a head 3. The base, intermediate portion and head are integral. The base is enlarged so as to surround and cover the hot water and cold water inlet and also the operative parts,—the inlets and operative parts will be presently referred to.

The base 1 of the casing is flanged as at 1$^a$ and is mounted upon a support 15 which is shown as in the form of a plate and provided with a pair of depending nipples 16, 16$^a$, each formed with interior screw threads. The plate 15 is formed with a cold water inlet 15$^a$ and a hot water inlet 15$^b$. Extending into the nipple 16 and engaging with the interior threads thereof is a cold water supply pipe 17 and extending into the nipple 16$^a$ and engaging with the threads thereof is a hot water supply pipe 17$^a$. The pipes 17 and 17$^a$ terminate at a point removed from the upper ends of their respective nipples and arranged within the port 15$^a$ and seated above the upper end of the pipe 17 is a check valve 16′ and arranged within the hot water inlet 15$^b$ and seated above the upper end of the pipe 17$^a$ is a check valve 17′. The size of the base 1 of the valve casing is such as to inclose the check valves 16′ and 17′. The base 1 of the valve casing is secured to the plate 15 by the hold fast devices 31. Interposed between the flange 1$^a$ and the plate 15 is a packing 32 for forming a water tight joint between the casing and the plate.

The head 3 of the valve casing has the top thereof formed with an outlet 4 with the wall thereof screw threaded and engaging with the threaded wall of the outlet 4 is a peripherally threaded service pipe.

Each side of the head 3 is formed with an opening, the said openings alining and the walls of each are provided with threads. One of said openings is indicated at 3ª and the other at 3ᵇ. The opening 3ª is of greater diameter than the opening 3ᵇ and engaging the threads of the wall of the opening 3ª is an interiorly and exteriorly threaded bushing 7 having its inner end provided with an inwardly-extending annular flange 7'. The peripheral threads of the bushing 7 engage with the threads of the wall of the opening 3ª. Engaging with the interior threads of the bushing 7 are the peripheral threads of a bushing 8 and between the two bushings is arranged a packing 9, the two bushings and packing 9 constituting a stuffing box. Engaging with the threads of the wall of the opening 3ᵇ is a peripherally threaded hollow plug 6 provided with a bearing 6'.

The device is provided with a regulating means so as to adjust the inlet valves to obtain the desired temperature in the service pipe, the said regulating means being manually operated and consists of a regulator 10 having an eccentrical intermediate portion 11, a journal 12 extending into the bearing 6', a flange 13 arranged outwardly with respect to the flange 7' of the bushing 7, a journal 13ª mounted in a bearing 13ᵇ formed by an inwardly-extending flange at the inner end of the bushing 8. Projecting from the journal 13ª is a squared head 14 inclosed by the bushing 8. The head 14 is adapted to be engaged by a tool, such as a wrench, for manually adjusting the regulating means. The flange 13 is positioned between the bushings 7 and 8 and maintains the regulator from longitudinal shifting with respect to the head 3.

The plate 15, centrally of the two inlets, is formed with a vertically disposed bifurcated post 18 in which is pivoted a bar 19. The pivot pin for the bar is indicated at 20. On that end of the bar which extends toward the cold water inlet, the bar is cupped on its upper face as at 21 so as to provide a seat for the lower end of a coil spring 22, the other end of said spring pressing upwardly against the base 1 and engages in a seat 23 formed in the inner face of the base 1 at the top thereof. A short distance from the pivot of the bar 19 toward the hot water supply of the base 1, the upper face of the bar 19 is provided with a V-shaped pocket 24 into which extends a protuberance formed on the bottom of the expansion tube and which will be presently referred to.

The expansion tube consists of a hollow cylindrical body-portion 25, preferably constructed of brass, and which provides an expansion chamber 25ª filled with a suitable liquid. The upper end of the body-portion 25 is closed through the medium of a cap 26 formed with annular corrugations 26'. The lower end of the body-portion 25 is closed through the medium of a base piece 27 provided with a protuberance 27' of the necessary width as to freely seat in the V-shaped pocket 24, the lower edge of the protuberance being of chisel-shape as shown. The base piece 27 centrally thereof is provided with a filling opening having the wall thereof screw-threaded and engaging with the threads of said wall is a removable plug 28. Mounted upon the cap 26 is an inverted cup-shaped fitting 29 having the top thereof formed with a vertically disposed stud 30 provided with a concaved bearing 30' in which is seated the eccentrically-disposed intermediate portion 11 of the regulator 10. The said intermediate portion of the regulator 10 rotates in the concaved bearing 30'. The fitting 29 is provided with an annular flange 29' which surrounds the cap 26 for the purpose of maintaining the body-portion 25 in a vertical position.

The operation of the device is as follows: It will be assumed that the expansion chamber is filled solid with water, alcohol or any other liquid suitable for the purpose. The tube is then placed in position and the other elements of the device assembled as shown in Fig. 1 and the device connected up to a hot and cold water supply at the bottom and to a service pipe at the head. In normal position, the hot water, being free to enter, raises the check valve to the point shown by dotted lines, Fig. 1. Owing to the contracted shape of the cylindrical part of the housing, the incoming water must pass upwardly along the expansion tube, and as the contained liquid and metal expands, the tube lengthens and presses down the bar 19, thus closing off the hot water supply and permitting the cold water to enter. Should the hot water become cooler or reduced in temperature, the expansion chamber contracts, the spring shutting off the cold water in exact ratio as the hot water has become cooled, and, inversely, if the hot water becomes too hot, the expansion tube will close off the hot water automatically and permit more cold water to enter until the standard temperature is reached. The check valves prevent any water from returning into the supply pipe. To adjust the valves so that the desired temperature is obtained in the service pipe, the regulator 10 is turned by a suitable tool until the desired temperature is reached and the supply of water to the service pipe is maintained at such temperature due to the manner in which the elements act so as to control the supply of both the hot and cold water.

To provide friction to keep the eccentric regulator in a fixed position, the bushing 8 of the stuffing box may be tightened up against the packing and the flange 13, or the plug 6 may be advanced to press against the shoulder formed by the journal. The squared end 14 of the member 10 is provided with an arrow as shown in Fig. 3 so as to indicate the position of the eccentric.

What I claim is:

1. A thermostatic valve comprising a casing having an outlet at one end, a cold water supply and a hot water supply communicating with the other end of said casing, controlling valves for said water supplies, a pivotally-mounted bar disposed to have its respective ends lie over the controlling valves for said hot water supply and said cold water supply, a spring acting on the bar to normally hold the same in engagement with the controlling valve for the cold water supply, an eccentric journaled in the casing near the outer end thereof and adjustable exteriorly of the casing, and a thermostatic member mounted in the casing and supported at its ends by said eccentric and bar respectively.

2. In a thermostatic valve, the combination with a supporting member having a cold water inlet and a hot water inlet, and a controlling valve for each of said inlets, of a casing mounted on the supporting member and having an enlarged end communicating with said inlets, an outlet at the other end of said casing, an eccentric journaled in the casing near its outer end and adjustable exteriorly of the casing, a regulating bar pivotally-mounted on the supporting member and having its ends projecting on opposite sides of the pivotal point to lie over the respective controlling valves, a spring engaging said controlling bar at one end, and a thermostatic member mounted within the casing and supported at its ends by said eccentric and said bar, said member engaging the bar on the side of the pivot point opposite to that engaged by the spring.

3. In a thermostatic valve, the combination with a cold water supply and a hot water supply, and a valve for each of said supplies, of a casing with which said supplies are in communication, said casing provided with an outlet, an eccentric supported within the casing near the outlet, a pivoted bar mounted in the casing near the said inlets and having its respective ends lying over the said inlets, a spring acting against one of said ends, and a thermostatic member mounted in the casing and supported at its ends by said eccentric and said bar, said thermostatic member acting against the other end of said bar.

Signed at New York city in the county and State of New York this 15th day of April A. D. 1911.

JAMES J. LAWLER.

Witnesses:
 EDGAR M. GREENBAUM,
 CHARLES V. DWYER.